April 18, 1939.  W. WISHINSKY  2,154,650
GRATER
Filed May 27, 1938
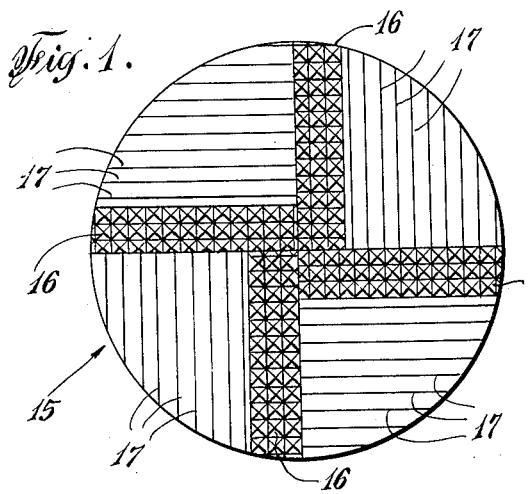
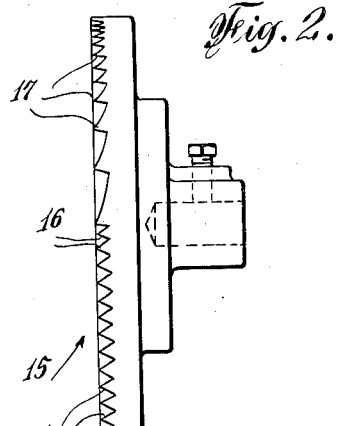
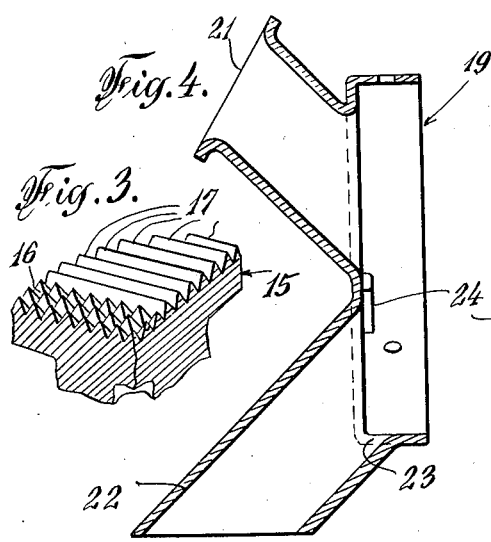
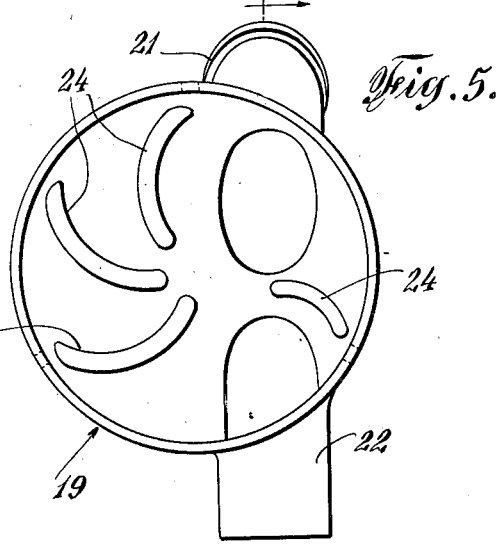
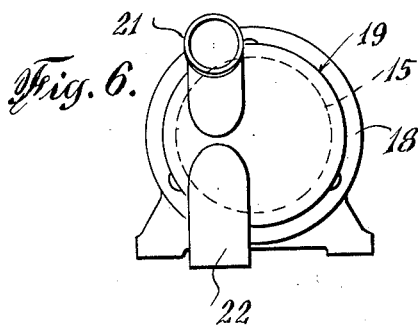
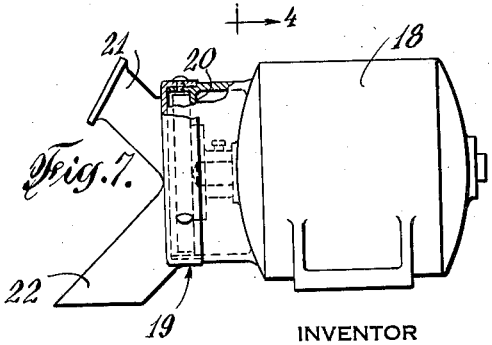
INVENTOR
William Wishinsky
BY
ATTORNEY Patented Apr. 18, 1939

2,154,650

UNITED STATES PATENT OFFICE 2,154,650

GRATER

William Wishinsky, New York, N. Y.

Application May 27, 1938, Serial No. 210,366

1 Claim. (Cl. 146—177)

My present invention relates to vegetable graters.

The principal object of this invention is to provide a novel and improved device for reducing carrots, beets, potatoes, turnips and the like, to a juicy mash of a consistency like that of apple sauce.

Other objects will become manifest as this disclosure proceeds.

In the accompanying drawing forming part hereof, similar characters of reference indicate corresponding parts in all the views.

Fig. 1 is a front view of the grating member.

Fig. 2 is a side view thereof.

Fig. 3 shows substantially, a quadrant of Fig. 1 in perspective.

Fig. 4 is a side view, partly in section, of the casing member within which the grating member of Fig. 1 is housed.

Fig. 5 is a side view of Fig. 4 showing the interior of said casing member.

Fig. 6 is a front view of a machine embodying the teachings of this invention.

Fig. 7 is a side view of Fig. 6.

In the drawing, the numeral 15 designates generally the active grating means which is an axially rotatable disc having scoring members 16 and scraping blades 17 extending forwardly from one of its surfaces. In the preferred embodiment shown, these scorers and blades are positioned in groups so that each group defines a quadrant on the face of the disc; the blades 17 in any group, being parallel to a straight edge boundary of the quadrant they occupy, and perpendicular to the blades in an adjoining quadrant. The disc 15 is mounted on the shaft of an electric motor 18 and housed in a casing comprising a back 20 secured to the motor frame, and a member 19 detachably secured to the back member 20 the removal of which facilitates cleaning. The casing member 19 is provided with a forwardly, upwardly extending hopper 21, and a downwardly, outwardly extending discharge tube 22. Both the hopper and the discharge tube are in vertical alinement, open into the casing and are positioned to one side of the vertical diameter of disc 15.

The machine illustrated in the drawing is designed to operate upon counter-clockwise rotation of the disc 15. The surface of the bottom end of a vegetable manually pushed against the disc 15 through the hopper 21, is first scored by action of the elements 16, and then scraped by action of the blade 17. The removed material resides in the channels formed between the blades 17, until the latter assume vertical position, when such substance drains off into the discharge tube 22 and is collected in a suitable receptacle, not shown. It is to be noted that the wall of the discharge tube 2 is joined at region 23 which is at about the base of the channels or sluices formed between the blades 17. Centrifugal force, besides the action of gravity, aids in the discharge of grated material into the tube 22. Inwardly extending ribs 24 aid drainage. The material issuing from the discharge tube 22 is a soft mash of juicy consistency.

This invention is capable of numerous forms and various applications without departing from the essential features herein disclosed. It is therefore intended and desired that the specific embodiments herein shown, be deemed illustrative and not restrictive and that the patent shall cover whatever features of patentable novelty exist herein; reference being had to the following claim, rather than to the specific description herein, to indicate the scope of this invention.

I claim:

In a device of the character set forth, a disc, rotatably mounted about an axis passing perpendicularly through the centres of its faces, provided substantially on an entire surface thereof with groups of outwardly extending scraping blades; each group of blades determining a sector of said surface of the disc, and the blades of any individual group being parallel to one of the straight sides of the sector they determine; all such sectors formed being adjacent one another and the blades of adjacent groups being in angular relation; said disc being also provided with a group of scoring elements on the face thereof extending radially between each group of blades and its adjacent group, said scraping blades being in the form of ridges and the scoring elements being in the form of pyramids rising from the face of the disc.

WILLIAM WISHINSKY.